(12) United States Patent
Wada (10) Patent No.: US 7,995,283 B2
(45) Date of Patent: Aug. 9, 2011

(54) ZOOM LENS AND OPTICAL APPARATUS INCLUDING ZOOM LENS

(75) Inventor: Ken Wada, Sakura (JP)

(73) Assignee: Canon Kabushiki Kaisha (JP)

( * ) Notice: Subject to any disclaimer, the term of this patent is extended or adjusted under 35 U.S.C. 154(b) by 58 days.

(21) Appl. No.: 12/633,445

(22) Filed: Dec. 8, 2009

(65) Prior Publication Data

US 2010/0149653 A1    Jun. 17, 2010

(30) Foreign Application Priority Data

Dec. 11, 2008 (JP) ................................. 2008-316039

(51) Int. Cl.
*G02B 15/14* (2006.01)
*H04N 5/262* (2006.01)
(52) U.S. Cl. ...................... 359/682; 359/680; 348/240.3
(58) Field of Classification Search ............... 348/240.3; 359/680, 681, 682
See application file for complete search history.

(56) References Cited

U.S. PATENT DOCUMENTS

| 7,139,131 | B2 * | 11/2006 | Nanba et al. ................. 359/687 |
| 7,292,398 | B1 | 11/2007 | Misaka |
| 7,480,102 | B2 | 1/2009 | Yokoyama |
| 7,535,652 | B2 * | 5/2009 | Ichikawa et al. ............. 359/686 |
| 7,535,654 | B2 * | 5/2009 | Ohashi ......................... 359/690 |
| 7,580,202 | B2 * | 8/2009 | Wada ............................ 359/689 |
| 7,593,171 | B2 * | 9/2009 | Nishimura ................... 359/781 |
| 7,864,453 | B2 * | 1/2011 | Maetaki ....................... 359/754 |
| 2007/0053069 | A1 | 3/2007 | Yagyu et al. |
| 2011/0002046 | A1 * | 1/2011 | Wada et al. .................. 359/683 |

FOREIGN PATENT DOCUMENTS

| EP | 2 196 837 A1 * | 6/2010 |
| JP | 2005-106878 A | 4/2005 |
| JP | 2007-178894 A | 7/2007 |

OTHER PUBLICATIONS

Partial European Search Report issued in corresponding European Patent Application No. 09178763.0 dated Feb. 24, 2010.

* cited by examiner

*Primary Examiner* — David N Spector
(74) *Attorney, Agent, or Firm* — Rossi, Kimms & McDowell LLP (57) ABSTRACT

Provided is a zoom lens in which both higher-order components of distortion and lateral chromatic aberration are corrected in a retrofocus type optical system. The zoom lens includes, in order from a magnifying side, a first lens unit which is negative, a second lens unit which is positive, and a rear lens group which is positive. A solid material having high dispersion and high extraordinary dispersion is used for a negative lens included in the first lens unit to provide a suitable shape and refractive power.

10 Claims, 10 Drawing Sheets

ZOOM LENS AND OPTICAL APPARATUS INCLUDING ZOOM LENS

BACKGROUND OF THE INVENTION

1. Field of the Invention

The present invention relates to a retrofocus type zoom lens including a negative lens unit located on a magnifying side.

2. Description of the Related Art

In an image projection apparatus such as a liquid crystal projector, an optical system with a wide field angle is required to project a large image at a short distance. In contrast to this, an optical system having a relatively long back focus is required to provide a color combining optical system (such as a prism) between a final surface of a projection optical system and an image display element such as a liquid crystal panel.

An interchangeable lens for a single-lens reflex camera requires a space for providing a mirror box on the rear side (image pickup element side or film surface side) of the interchangeable lens, and thus is required to have a back focus longer than a focal length.

Therefore, as such an optical system, there is used a retrofocus type optical system in which a negative refractive power is arranged on a magnifying side and a positive refractive power is arranged on a reduction side. However, the refractive powers are asymmetrically arranged, and hence it is difficult to correct a distortion or a lateral chromatic aberration.

In recent years the number of pixels of the image display element used in image projection apparatus and the number of pixels of an image pickup element used in single-lens reflex camera have rapidly increased. For that reason, an optical system having high optical performance over the entire magnification range is required. In particular, it is important to correct distortion corresponding to distortion of an image, or a chromatic aberration which influences color blurring or sharpness of an image in a case of a white light source to a high degree.

U.S. Pat. No. 7,292,398 and U.S. Pat. No. 7,480,102 each disclose a structure, in which an optical element having large extraordinary dispersion is provided as a concave lens of a first lens unit (negative lens unit) of the retrofocus type optical system, in which the negative lens unit is provided on the magnifying side, to thereby reduce the lateral chromatic aberration.

In the structure described above, a material having large extraordinary dispersion is influenced by a small negative refractive power to correct a lateral chromatic aberration of the g-line in the vicinity of a wide-angle region. However, when an image obtained by a digital image pickup apparatus is to be greatly enlarged or when the image is to be enlarged and projected onto a screen by the image projection apparatus, it is necessary to further reduce the chromatic aberration. However, in order to correct the chromatic aberration, when the refractive power of an element made of an extraordinary dispersion material is increased to strongly correct the chromatic aberration, the element needs to have a biconcave shape, and hence it is difficult to correct the distortion to a high standard.

Japanese Patent Application Laid-Open No. 2007-178894 discloses a structure in which a concave lens having a partial dispersion characteristic larger than a reference line ($\theta = -0.001682 \ast vd+0.6438$) is provided for the first lens unit (negative lens unit) of the retrofocus type optical system, in which the negative lens unit is provided on the magnifying side.

In the above-mentioned Japanese Patent Application Laid-Open No. 2007-178894, the extraordinary dispersion characteristic and the refractive power of the negative lens are insufficient, and hence a secondary chromatic aberration correction effect is not sufficiently obtained. Therefore, it is difficult to sufficiently correct the lateral chromatic aberration of the g-line in the vicinity of an image at the wide-angle end.

SUMMARY OF THE INVENTION

According to the present invention, there is provided a zoom lens, including, in order from a magnifying side: a first lens unit having a negative refractive power; a second lens unit having a positive refractive power; and a rear lens group, which includes multiple lens units and has a positive refractive power as a whole, in which at least two lens units are moved for magnification, in which the first lens unit includes a first lens having a negative refractive power, and in which the following conditions are satisfied:

$$0.79 < \theta g F_{NL} - (1.0E{-}4 \times vd_{NL}^2 - 9.1E{-}3 \times vd_{NL}) < 1.00,$$

$$1.5 < (R1+R2)/(R1-R2) < 10.0, \text{ and}$$

$$0.0005 < |\Delta\theta g F_{NL} \cdot fw)/(vd_{NL} \cdot f_{NL})| < 0.0020,$$

where R1 and R2 indicate a magnifying side curvature radius and a reduction side curvature radius of the first lens, $\theta g F_{NL}$ indicates a partial dispersion ratio of the first lens with respect to a g-line and an F-line, $vd_{NL}$ indicates an Abbe number of the first lens, $N_{NL}$ indicates a refractive index of the first lens, and $f_{NL}$ indicates a focal length of the first lens, and where $\Delta\theta g F_{NL} = \theta g F_{NL} - (-0.001682 \times vd_{NL} + 0.6438)$.

According to the present invention, even when a retrofocus type optical system is provided as a zoom lens, both a distortion and a lateral chromatic aberration may be excellently reduced.

Further features of the present invention become apparent from the following description of exemplary embodiments with reference to the attached drawings.

DESCRIPTION OF THE EMBODIMENTS

Hereinafter, a zoom lens according to each of exemplary embodiments of the present invention and an optical apparatus (such as image pickup apparatus or image projection apparatus) including the zoom lens are described in detail with reference to the attached drawings.

Note that the image pickup apparatus includes: an image pickup element such as a charge coupled device (CCD), for photoelectrically converting an image (light) of a subject into an electrical signal; and a zoom lens for forming the image of the subject on the image pickup element (CCD). The image projection apparatus includes: an image display element such as a liquid crystal panel or a micro-mirror device having multiple minute mirrors; and a zoom lens for projecting light from the image display element to a projection surface such as a screen. In other words, according to the zoom lens, the image display element and the projection surface are brought into a conjugate relationship (relationship for forming image from image display element on projection surface).

In the image pickup apparatus described above, a reduction side (reduction conjugate side or side on which conjugate length is short) corresponds to an image pickup element side (CCD side), and a magnifying side corresponds to a subject side (magnifying conjugate side, side on which conjugate length is long, or object side). In the image projection apparatus, the reduction side corresponds to an image display element side (liquid crystal panel side or LCD (Liquid Crystal Display) side), and the magnifying side corresponds to a projection surface side such as a screen side (light traveling direction).

In each of zoom lenses according to Embodiments 1 to 3 of the present invention, at least two lens units are moved during magnification, to thereby ensure a desired magnification ratio. A wide-angle end and a telephoto end correspond to zoom positions in a case where a lens unit for zooming is located in each of both ends of a range in which the lens unit is moveable on an optical axis in view of mechanism.

Next, the zoom lenses according to the exemplary embodiments of the present invention are described.

Each of the zoom lenses according to the present invention includes, in order from the magnifying side, a first lens unit having a negative refractive power, a second lens unit having a positive refractive power, and the rear lens group, which includes multiple lens units and has a positive refractive power as a whole. The rear lens group includes a third lens unit, a fourth lens unit, a fifth lens unit, and a sixth lens unit in Embodiment 1 described later, and includes a third lens unit and a fourth lens unit in each of Embodiments 2 and 3 described later. Multiple lens units are moved in an optical axis direction during magnification (during zooming). The first lens unit which is located closest to the magnifying side and has the negative refractive power is not moved during magnification, but moved during focusing.

According to a feature of the zoom lens described above, the first lens unit includes a first lens having a negative refractive power, and the first lens satisfies the following Conditional Expressions (1), (2), and (3).

$$0.79 < \theta gF_{NL} - (1.0E{-}4 \times vd_{NL}^2 - 9.1E{-}3 \times vd_{NL}) < 1.00 \quad (1)$$

$$1.5 < (R1+R2)/(R1-R2) < 10.0 \quad (2)$$

$$0.0005 < |\Delta\theta gF_{NL} \cdot fw)/(vd_{NL} \cdot f_{NL})| < 0.0020 \quad (3)$$

where $\theta gF_{NL}$ indicates a partial dispersion ratio of the first lens with respect to a g-line and an F-line, $vd_{NL}$ indicates an Abbe number of the first lens, $N_{NL}$ indicates a refractive index of the first lens, and $f_{NL}$ indicates a focal length of the first lens. In addition, assume that $\Delta\theta gF_{NL}$ is defined by $$\Delta\theta gF_{NL} = \theta gF_{NL} - (-0.001682 \times vd_{NL} + 0.6438),$$

and R1 and R2 indicate a magnifying side curvature radius and a reduction side curvature radius of the first lens.

The Abbe number vd ($vd_{NL}$ in this case) and $\theta gF$ ($\theta gF_{NL}$ in this case) of the first lens which are defined as described above are normally used. When refractive indexes with respect to a g-line, an F-line, a d-line, and a C-line are denoted by Ng, NF, Nd, and NC, vd and $\theta gF$ are expressed by the following equations.

$$vd = (Nd-1)/(NF-NC)$$

$$\theta gF = (Ng-NF)/(NF-NC)$$

In the present invention, a solid material refers to a material which is solid in a case where the optical system is used, and thus a state before the optical system is used, such as a manufacturing state is not mentioned. For example, a solid material obtained by curing a material which is liquid during manufacturing corresponds to the solid material in the present invention.

Conditional Expression (1) specifies a relationship between the Abbe number and the partial dispersion ratio of the first lens. When the condition of Conditional Expression (1) exceeds any one of the upper limit and lower limit thereof, the extraordinary dispersion of the first lens becomes excessive or insufficient, and hence it is difficult to correct a secondary chromatic aberration.

It is more desirable to satisfy the following Conditional Expression (1a), and hence a zoom lens may be realized in which a lateral chromatic aberration in a short-wavelength region is excellently reduced.

$$0.79 < \theta gF_{NL} - (1.0E{-}4 \times vd_{NL}^2 - 9.1E{-}3 \times vd_{NL}) < 0.95 \quad (1a)$$

Conditional Expression (2) specifies a shape of the first lens. When the condition of Conditional Expression (2) exceeds the lower limit thereof, the magnifying side curvature radius becomes smaller, and hence it is difficult to correct a distortion. In contrast to this, when the condition of Conditional Expression (2) exceeds the upper limit thereof, a refractive power provided for the solid material becomes smaller, and hence secondary chromatic aberration correction performance reduces.

It is more desirable to satisfy the following Conditional Expression (2a), and hence a zoom lens may be realized in which the distortion and the secondary chromatic aberration are excellently reduced.

$$2.6 < (R1+R2)/(R1-R2) < 7.0 \quad (2a)$$

Conditional Expression (3) specifies secondary chromatic aberration reduction performance of the first lens. This conditional expression specifies a relationship with respect to not only the extraordinary dispersion but also high dispersion and the refractive power of the first lens. When $|\Delta\theta gF_{NL} \cdot fw)/(vd_{NL} \cdot f_{NL})|$ is equal to or smaller than the lower limit of the Conditional Expression (3), the correction of the secondary chromatic aberration using the first lens is insufficient, and hence there remains color blurring in the vicinity of a wide-angle region. In contrast to this, when $|\Delta\theta gF_{NL} \cdot fw)/(vd_{NL} \cdot f_{NL})|$ is equal to or greater than the upper limit of the Conditional Expression (3), the chromatic aberration is excessively corrected. This is not desirable.

It is more desirable to satisfy the following Conditional Expression (3a), and hence a zoom lens may be obtained in which the secondary chromatic aberration is excellently corrected.

$$0.0005 < |\Delta\theta gF_{NL} \cdot fw)/(vd_{NL} \cdot f_{NL})| < 0.0015 \quad (3a)$$

In the zoom lens according to the present invention, the Abbe number $vd_{NL}$ of the first lens desirably satisfies the following conditional Expression.

$$10.0 < vd_{NL} < 23.5 \quad (4)$$

When $vd_{NL}$ is equal to or smaller than the lower limit of the Conditional Expression (4), it is difficult to perform primary achromatism by the first lens unit. In contrast to this, when $vd_{NL}$ is equal to or greater than the upper limit of the Conditional Expression (4), it is difficult to correct a lateral chromatic aberration in a short-wavelength region close to the wide-angle region.

When the Abbe number $vd_{NL}$ of the first lens more desirably satisfies the following Conditional Expression (4a), the primary chromatic aberration may be more excellently corrected.

$$14.0 < vd_{NL} < 23.5 \quad (4a)$$

In the zoom lens according to the present invention, when an Abbe number of a positive lens located closest to the first lens is denoted by vp, it is further preferred that the following condition be satisfied.

$$10.0 < vp < 38.0 \quad (5)$$

Conditional Expression (5) is for excellently reducing a primary chromatic aberration caused by a high-dispersion solid material. When the Conditional Expression (5) is not satisfied, the chromatic aberration is excessively corrected or insufficiently corrected. This is not desirable.

When the Abbe number vp of the positive lens more desirably satisfies the following Conditional Expression, a more excellent effect is obtained.

$$18.5 < vp < 38.0 \quad (5a)$$

Further, the refractive index $N_{NL}$ of the first lens more desirably satisfies the following conditional expression.

$$1.70 < N_{NL} < 2.30 \quad (6)$$

Conditional Expression (6) specifies the refractive index of the first lens. When $N_{NL}$ is equal to or smaller than the lower limit of the Conditional Expression (6), not only the distortion caused by the first lens having the strong refractive power but also the lateral chromatic aberration become larger. In contrast to this, when $N_{NL}$ is equal to or greater than the upper limit of the Conditional Expression (6), a Petzval sum becomes larger, and hence it is difficult to reduce a field curvature.

When the refractive index $N_{NL}$ of the first lens more desirably satisfies the following conditional expression, $$1.75 < N_{NL} < 2.00 \quad (6a),$$

a zoom lens may be realized in which various aberrations including the distortion are excellently reduced.

Embodiment 1

Figure 1:
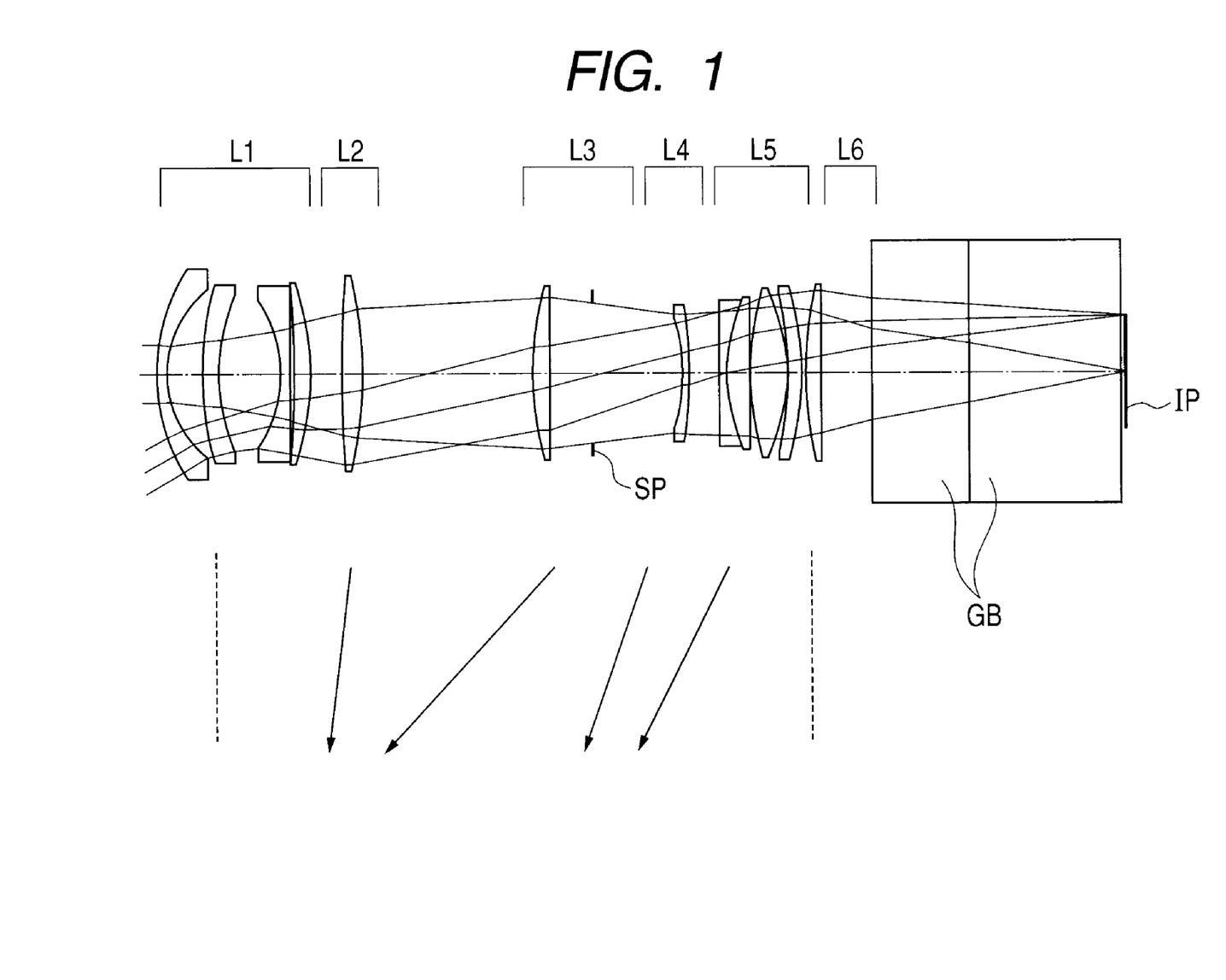
FIG. 1 is a lens cross sectional view illustrating Embodiment 1 of the present invention.

FIG. 1 is a lens cross sectional view illustrating the zoom lens according to Embodiment 1 of the present invention. The detailed optical data are described below in Numerical Embodiment 1. The zoom lens according to Embodiment 1 of the present invention is applied to a projection optical system used for an image projection apparatus. The zoom lens may be applied to an image pickup optical system.

The zoom lens according to Embodiment 1 includes, in order from the magnifying side, a first lens unit L1 having a negative refractive power, a second lens unit L2 having a positive refractive power, a third lens unit L3 having a positive refractive power, a fourth lens unit L4 having a negative refractive power, a fifth lens unit L5 having a positive refractive power, and a sixth lens unit L6 having a positive refractive power. Each of the first to sixth lens units includes at least one lens (or diffraction grating or mirror having curvature).

During magnification from the wide-angle end to the telephoto end, the second, third, fourth, and fifth lens units, i.e. lens units other than the first and sixth lens units, are moved to the magnifying side to ensure a magnification ratio of approximately 1.7 times. When a projection distance is changed, a focus operation (focusing) is performed by moving the first lens unit.

In this embodiment, a high-dispersion material is used for a negative lens (first lens) located closest to the magnifying side, in the first lens unit having the negative refractive power. Therefore, a high-dispersion material is used for a positive lens of the first lens unit and a suitable refractive power is provided for the positive lens, to thereby reduce a primary chromatic aberration caused by constituting the negative lens by the high-dispersion material.

The negative lens of the first lens unit is normally made of a low-dispersion material. In this embodiment, the negative lens is made of the high-dispersion material (vd=23.0). When the retrofocus type optical system has the structure described above, a function for returning the lateral chromatic aberration on the short-wavelength side of the wide-angle region to an under side is obtained.

When a high-extraordinary dispersion material ($\theta gF=0.6454$) is employed as a material of the first lens having the negative refractive power and a strong refractive power is provided for the first lens, a secondary lateral chromatic aberration in the vicinity of the wide-angle region, in particular, the degree of curve of a g-line may be corrected. The strong refractive power may be provided for the first lens having the negative refractive power, and hence a refractive index of the material of the first lens may be increased (Nd=1.77). Therefore, the amount of occurrence of distortion may be reduced. The first lens is provided as a negative meniscus lens having a convex surface facing toward the magnifying side so as to prevent mainly the distortion from significantly occurring.

The first lens is desirably provided in a magnifying side position far from a stop. In this case, the first lens may be provided in a position in which an on-axis beam height is low and an off-axis beam height is high, and hence the lateral chromatic aberration may be significantly corrected with little influence on an on-axis chromatic aberration.

Embodiment 2

Figure 2:
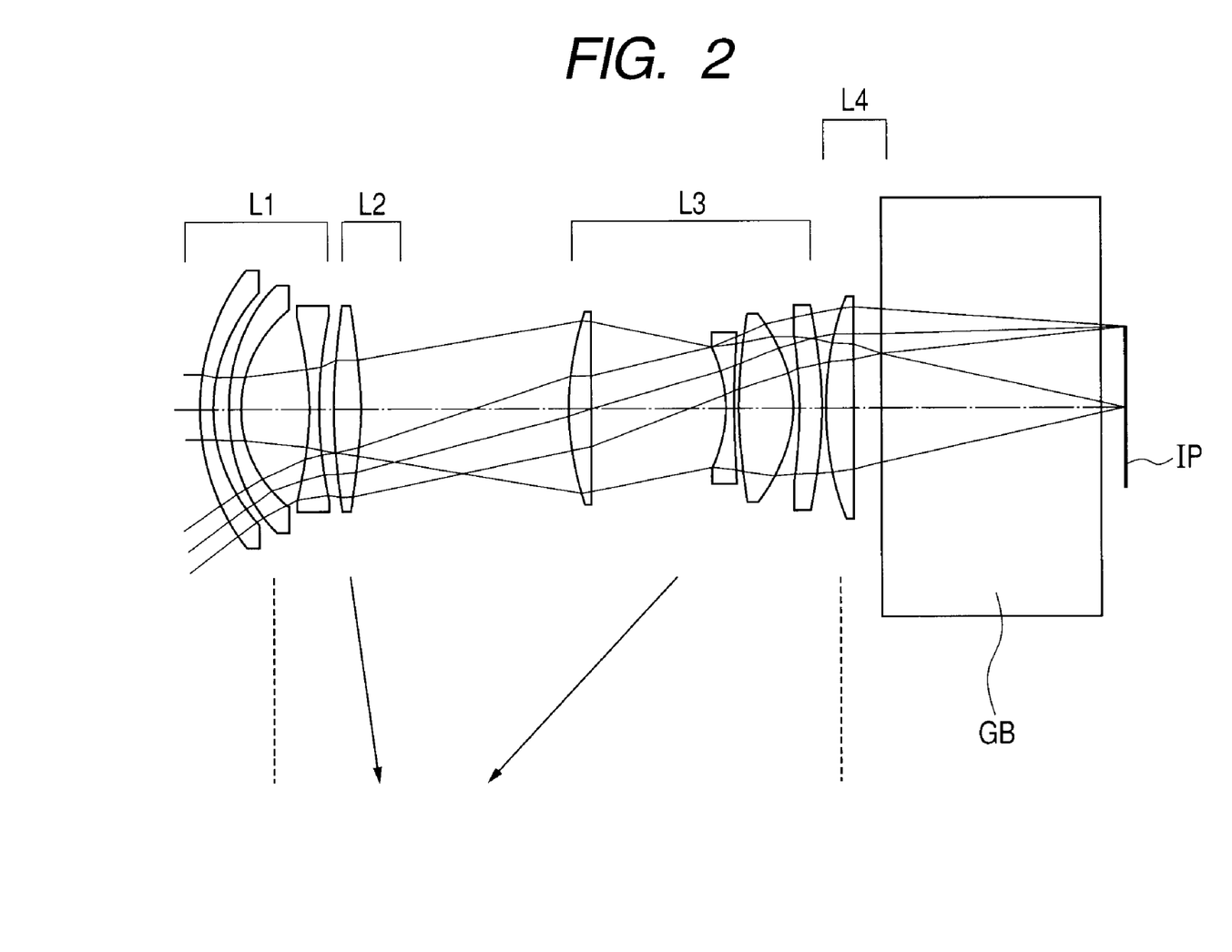
FIG. 2 is a lens cross sectional view illustrating Embodiment 2 of the present invention.

Hereinafter, the zoom lens according to Embodiment 2 of the present invention is described with reference to FIG. 2. The zoom lens according to this embodiment is applied to a projection optical system for an image projection apparatus. The detailed optical data of the zoom lens according to Embodiment 2 are described below in Numerical Embodiment 2.

The zoom lens according to Embodiment 2 includes, in order from the magnifying side, a first lens unit L1 having a negative refractive power, a second lens unit L2 having a positive refractive power, a third lens unit L3 having a positive refractive power, and a fourth lens unit L4 having a positive refractive power.

During magnification from the wide-angle end to the telephoto end, the first and fourth lens units are not moved, the second lens unit is moved to the reduction side, and the third lens unit is moved to the magnifying side, to thereby ensure a magnification ratio of approximately 1.5 times. A focus operation (focusing) is performed by moving the first lens unit.

In this embodiment, a material having extraordinary dispersion ($\theta gF=0.7200$) higher than that in Embodiment 1 is employed for a first lens having negative refractive power located closest to the magnifying side, in the first lens unit, and a stronger refractive power than that in Embodiment 1 is provided for the first lens. Therefore, a lateral chromatic aberration in the vicinity of the wide-angle region, in particular, the degree of curve of a g-line may be suppressed (reduced). The other structures are the same as that in Embodiment 1 and thus the detained description is omitted.

Embodiment 3

Figure 3:
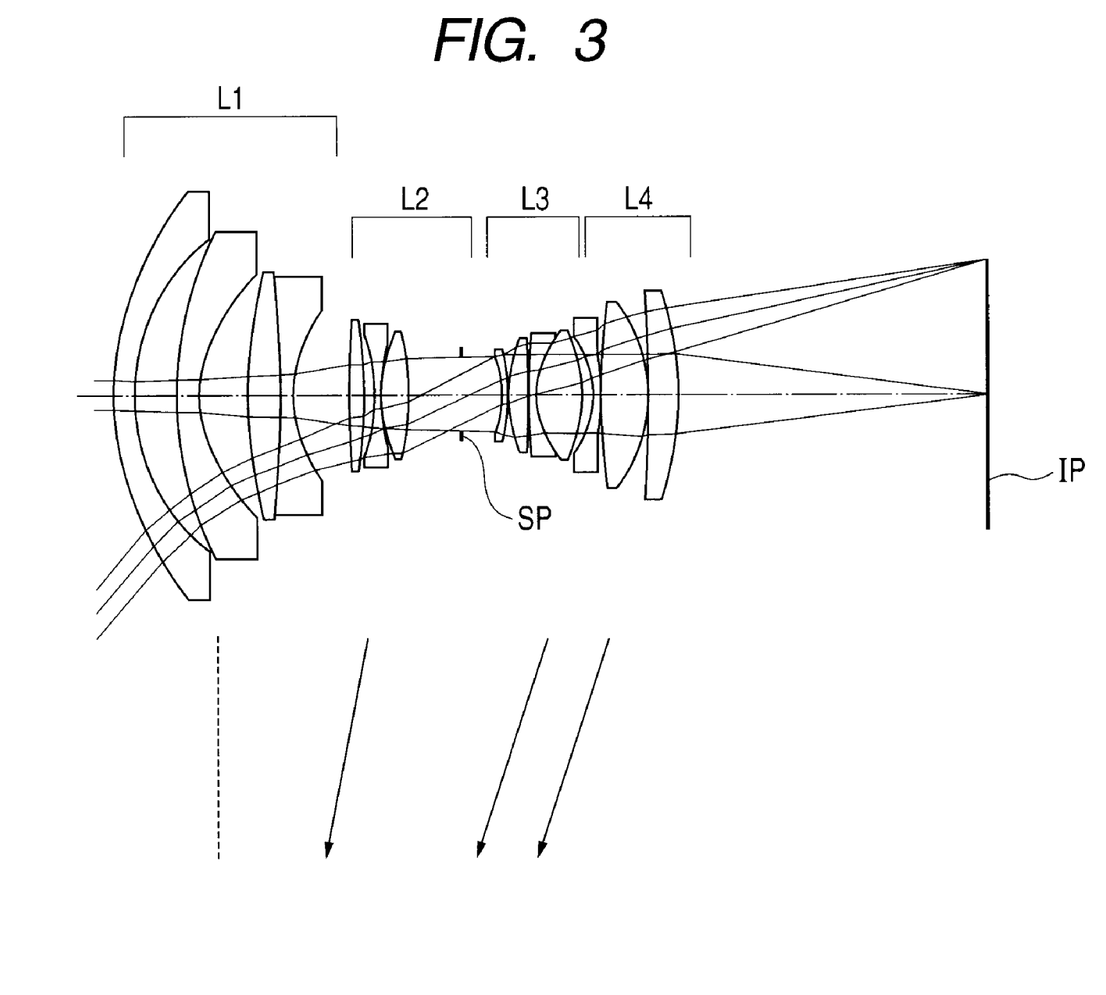
FIG. 3 is a lens cross sectional view illustrating Embodiment 3 of the present invention.
Figure 4A:
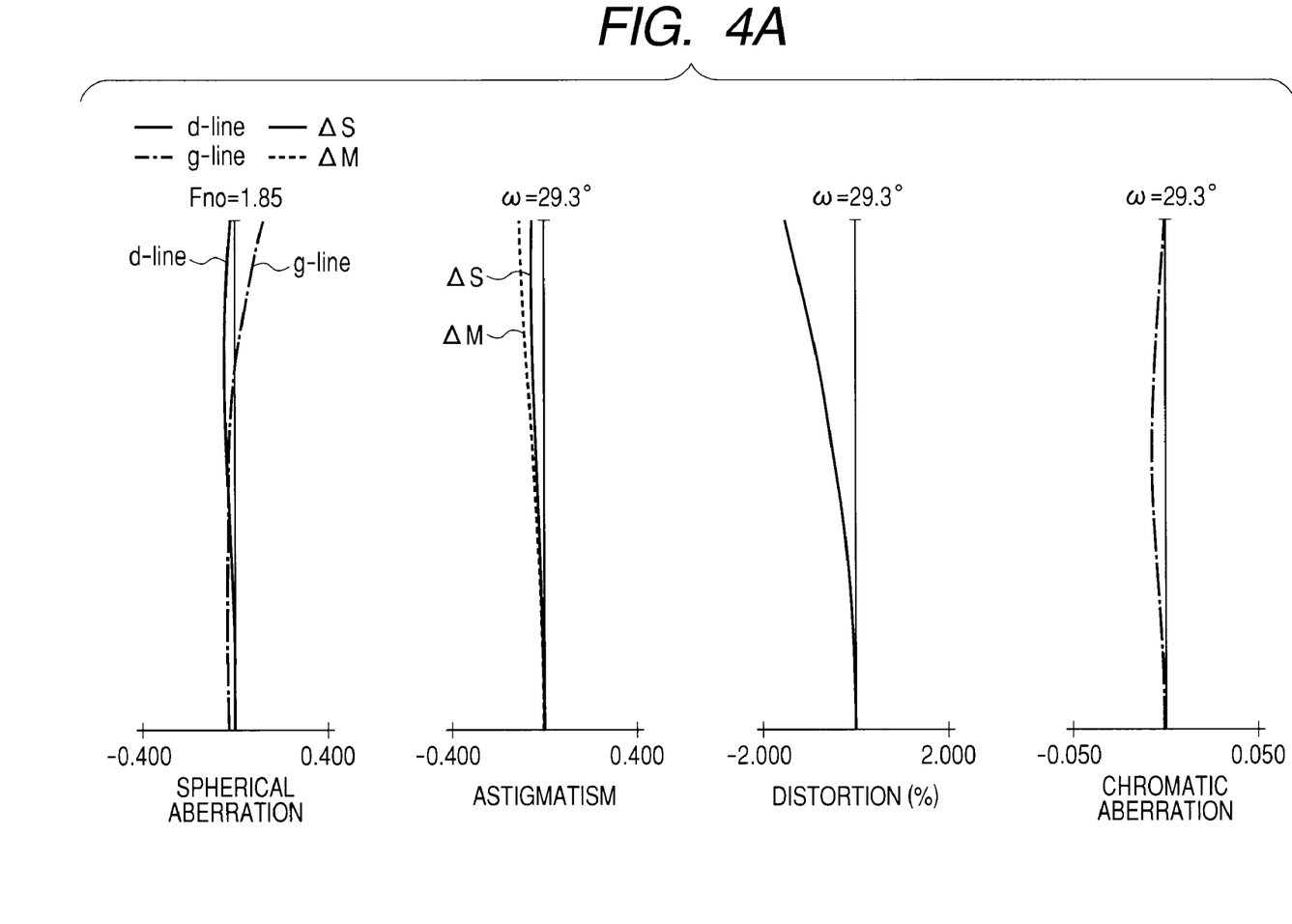
FIGS. 4A and 4B are aberration graphs in Embodiment 1 of the present invention.
Figure 4B:
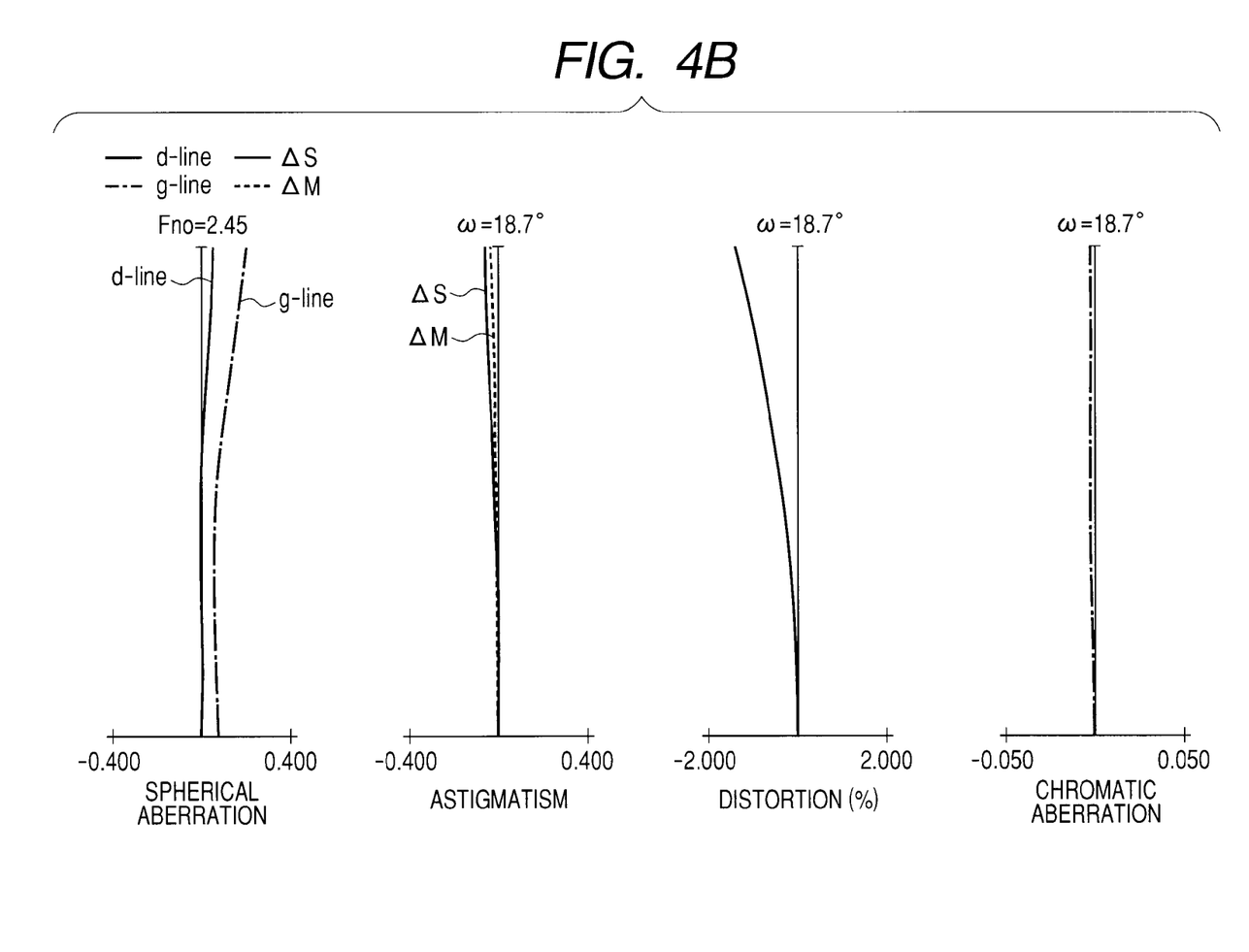
Figure 5A:
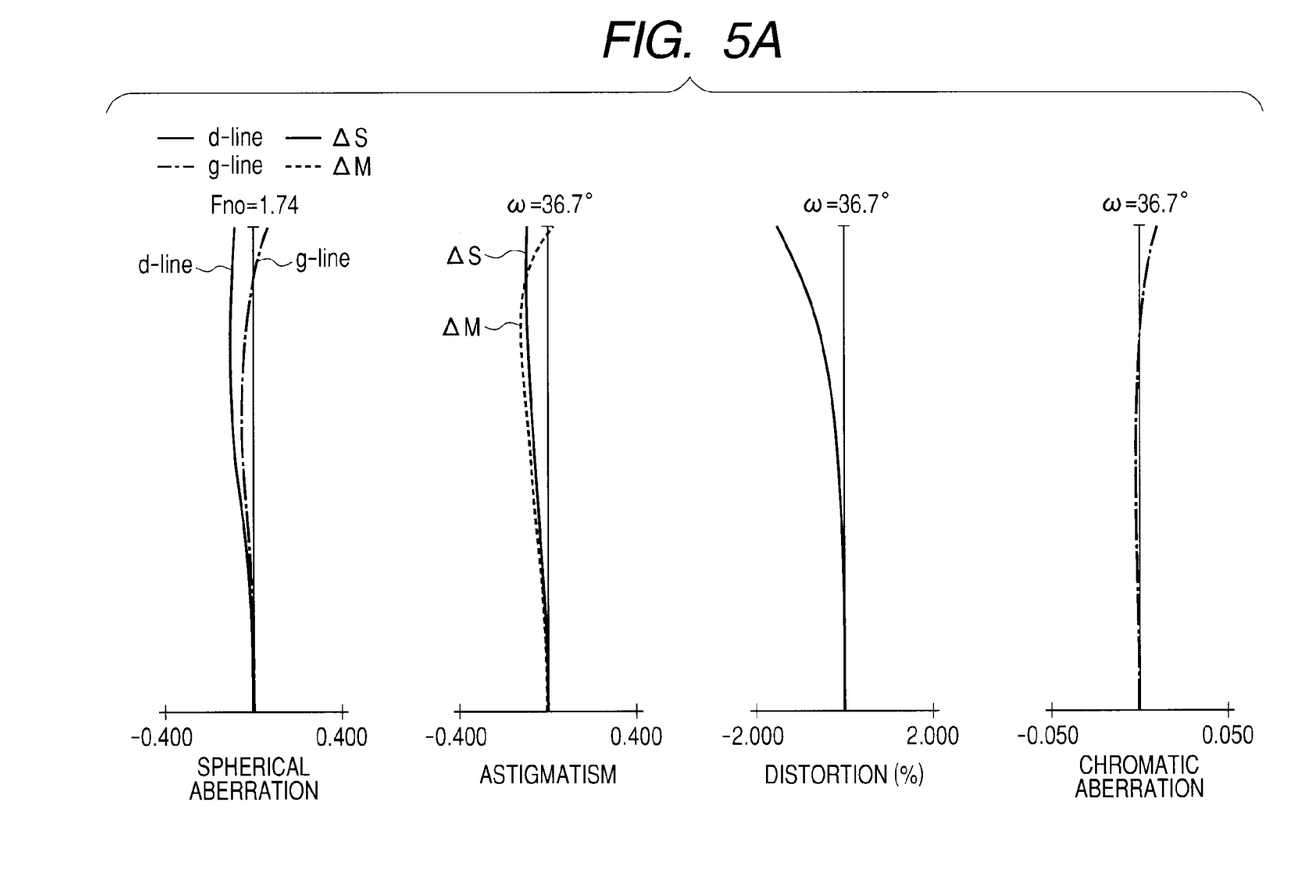
FIGS. 5A and 5B are aberration graphs in Embodiment 2 of the present invention.
Figure 5B:
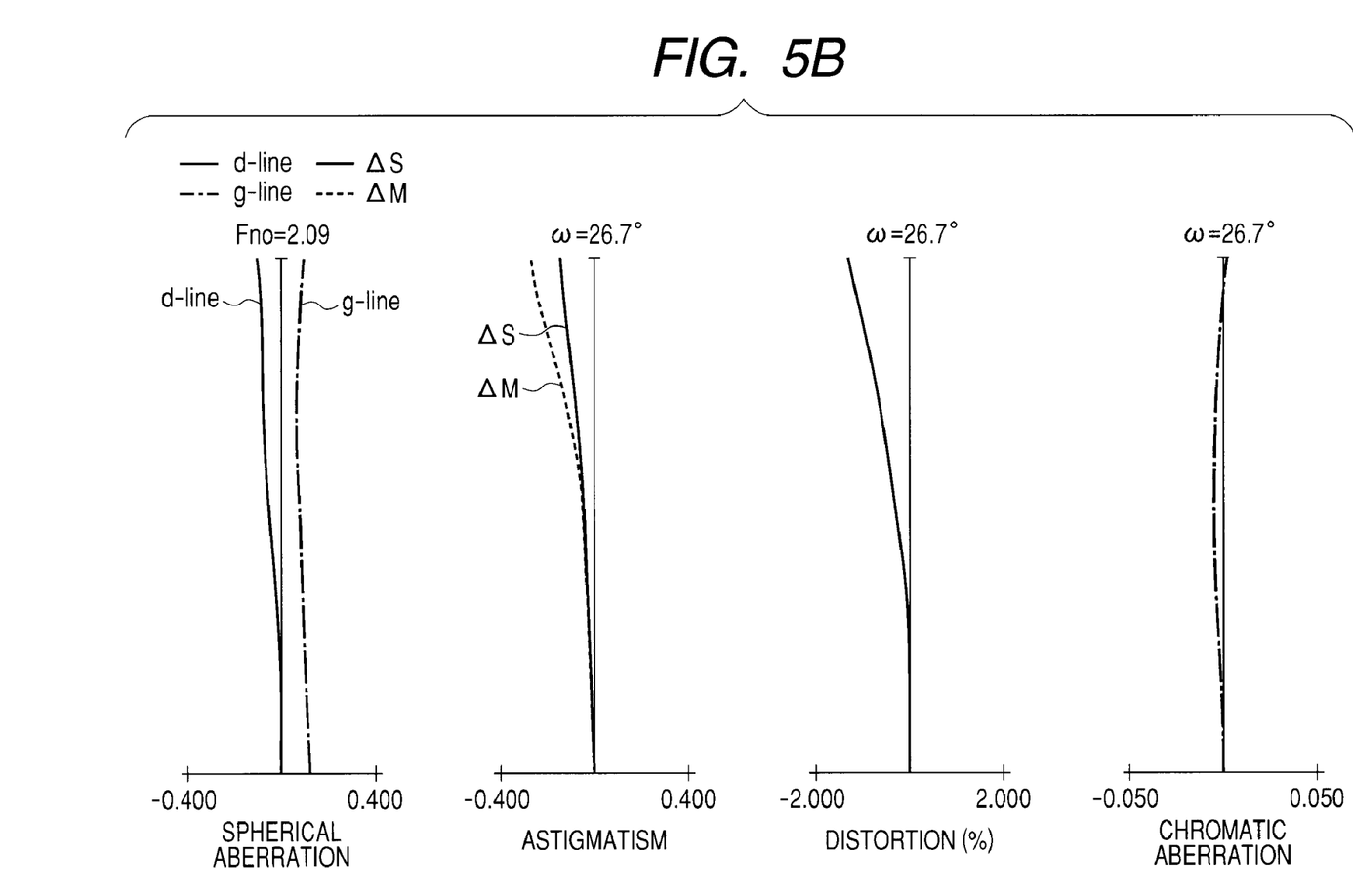
Figure 6A:
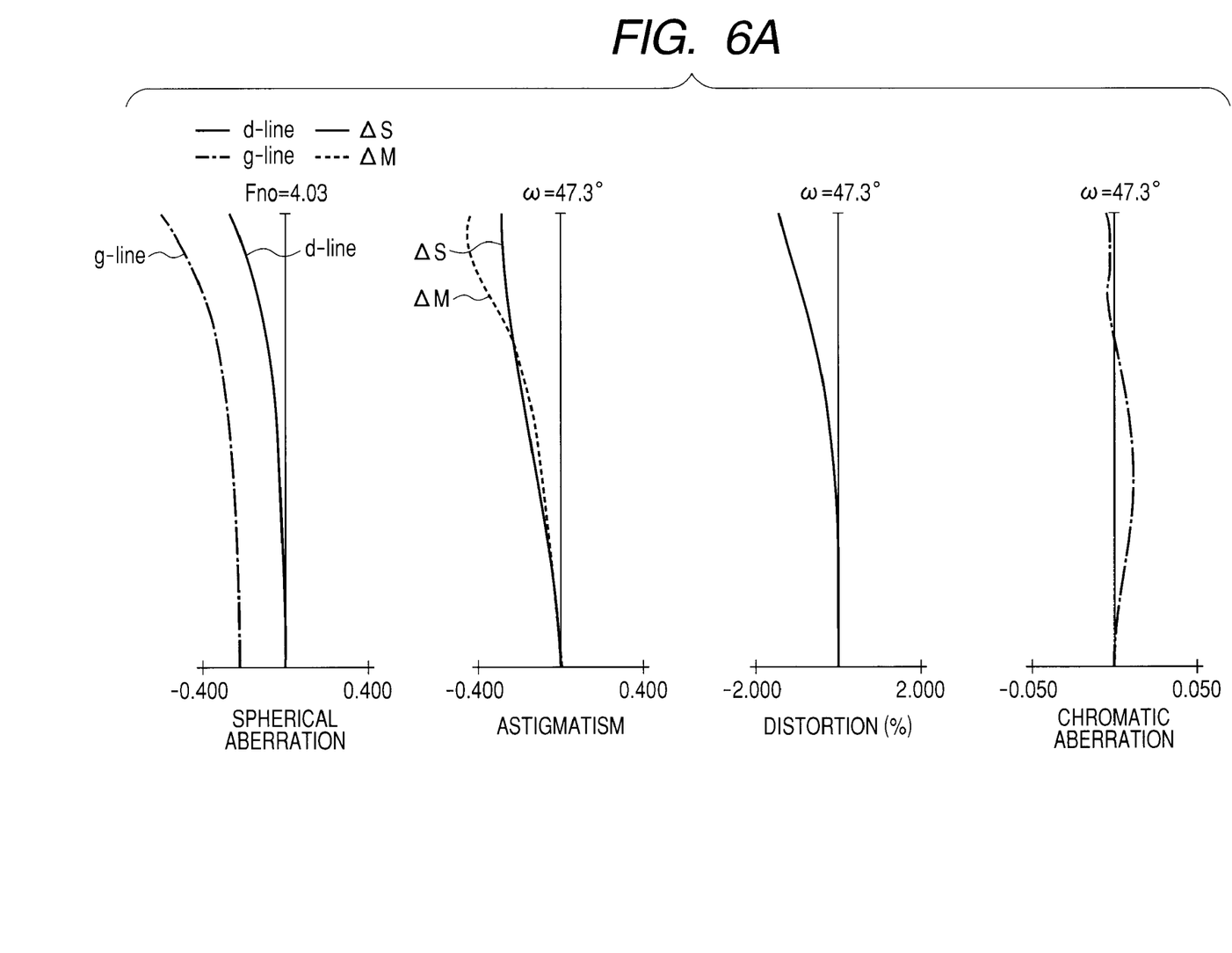
FIGS. 6A and 6B are aberration graphs in Embodiment 3 of the present invention.
Figure 6B:
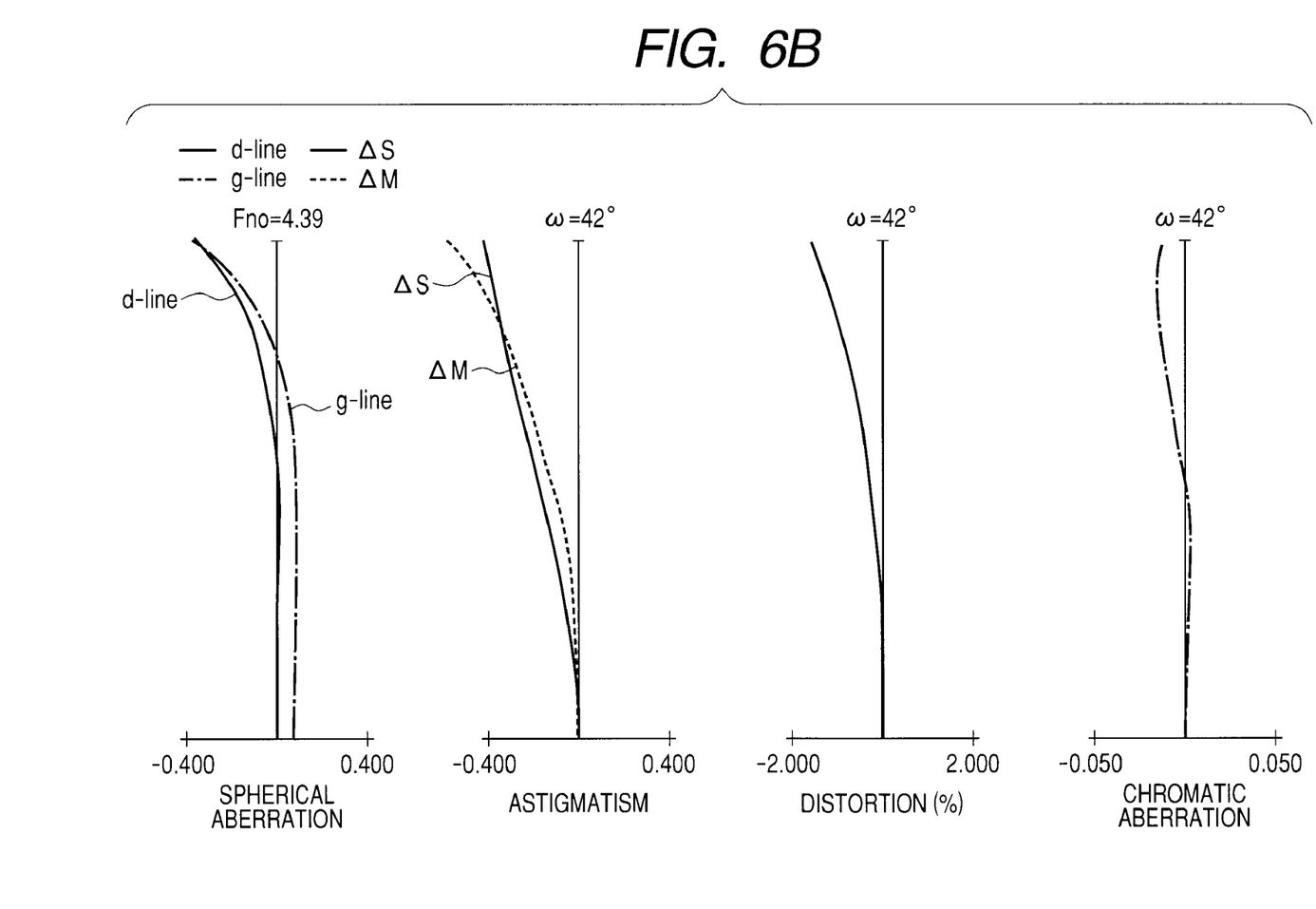

Hereinafter, the zoom lens according to Embodiment 3 of the present invention is described with reference to FIG. 3. The zoom lens according to this embodiment is applied to an optical system for a single-lens reflex camera. The detailed optical data of the zoom lens according to Embodiment 3 are described below in Numerical Embodiment 3.

The zoom lens according to Embodiment 3 includes, in order from the magnifying side (subject side), a first lens unit L1 having a negative refractive power, a second lens unit L2 having a positive refractive power, a third lens unit L3 having a positive refractive power, and a fourth lens unit L4 having a positive refractive power.

During magnification from the wide-angle end to the telephoto end, the first lens unit is not moved and the second, third, and fourth lens units are moved to the magnifying side.

In Embodiment 3, a material having dispersion (vd=17.4) higher than that in Embodiment 1 is used as a material of a negative lens (first lens) located closest to the magnifying side, in the first lens unit. Therefore, the lateral chromatic aberration on the short-wavelength side of the wide-angle region, which is caused in a retrofocus type optical system, may be excellently reduced. When a high-extraordinary dispersion material (θgF=0.6780) is employed as a material of the first lens having the negative refractive power and a strong refractive power is provided for the first lens, a lateral chromatic aberration in the vicinity of the wide-angle region, in particular, the degree of curve of a g-line may be lowered (reduced).

The first lens has the strong refractive power as in Embodiment 2, and hence a material having a higher refractive index (Nd=1.94) may be used as the material of the first lens, to thereby easily reduce the occurrence of distortion. The first lens is provided as a concave meniscus lens having a convex surface facing the magnifying side so as to prevent mainly the distortion from significantly occurring.

The other points which are not specially described are the same as in Embodiment 1.

Hereinafter, the detailed optical data of the zoom lenses according to Embodiments 1, 2, and 3 of the present invention are described. A surface number "i" is counted from the object side. In addition, Ri indicates a curvature radius of an i-th lens surface and Di indicates a total of a lens thickness and an air interval between the i-th surface and an (i+1)-th surface. Further, Ndi, vdi, and θgFi indicate a refractive index with respect to the d-line, an Abbe number with respect to the d-line, and a partial dispersion ratio between the g-line and the F-line.

Glass blocks GB located closest to the image side correspond to color combining prisms.

Assume that k, A, B, C, D, and E indicate aspherical coefficients.

When a displacement amount from a surface vertex in the optical axis direction at a position corresponding to a height h from the optical axis is expressed by x, an aspherical surface shape is defined using the following equation.

$$x=(h^2/R)/[1+\{1-(1+k)(h/R)^2\}^{1/2}]+Ah^4+Bh^6+Ch^8+Dh^{10}+Eh^{12}$$, where $R$ indicates a curvature radius.

Numerical Embodiment 1
Unit mm
Surface data

| Surface number | r | d | nd | vd | Effective diameter | θgF |
|---|---|---|---|---|---|---|
| 1 | 36.488 | 2.20 | 1.77071 | 23.0 | 39.95 | 0.6454 |
| 2 | 20.469 | 8.00 | | | 33.77 | |
| 3* | 115.181 | 3.15 | 1.52996 | 55.8 | 33.45 | |
| 4* | 34.800 | 13.50 | | | 31.52 | |
| 5 | −25.476 | 2.00 | 1.61800 | 63.3 | 30.21 | |
| 6 | 562.594 | 1.06 | | | 33.03 | |
| 7 | −206.077 | 3.45 | 1.83400 | 37.2 | 33.13 | |
| 8 | −51.759 | (Variable) | | | 33.71 | |
| 9 | 182.413 | 4.50 | 1.83400 | 37.2 | 36.58 | |
| 10 | −78.126 | (Variable) | | | 36.68 | |
| 11 | 59.217 | 3.34 | 1.74400 | 44.8 | 32.67 | |
| 12 | 551.067 | 10.01 | | | 32.29 | |
| 13 (Stop) | ∞ | (Variable) | | | 28.21 | |
| 14 | −38.926 | 1.40 | 1.78472 | 25.7 | 24.48 | |
| 15 | −96.081 | (Variable) | | | 25.25 | |
| 16 | 2335.057 | 1.50 | 1.83400 | 37.2 | 26.96 | |
| 17 | 32.535 | 5.15 | 1.48749 | 70.2 | 27.77 | |
| 18 | −718.589 | 0.15 | | | 28.75 | |
| 19 | 55.936 | 7.67 | 1.49700 | 81.5 | 30.77 | |
| 20 | −40.604 | 0.15 | | | 31.67 | |
| 21* | −107.080 | 3.30 | 1.52996 | 55.8 | 31.98 | |
| 22* | −65.137 | (Variable) | | | 32.66 | |
| 23 | 63.791 | 3.89 | 1.48749 | 70.2 | 33.49 | |
| 24 | −396.361 | 10.39 | | | 33.33 | |
| 25 | ∞ | 21.00 | 1.80518 | 25.4 | 50.00 | |
| 26 | ∞ | 0.00 | | | 50.00 | |
| 27 | ∞ | 32.76 | 1.51633 | 64.1 | 50.00 | |
| 28 | ∞ | 0.69 | | | 50.00 | |
| Image plane | | | | | | |

Aspherical data

Third surface

K = −8.65288e−001   A4 = 1.28924e−005   A6 = −3.94860e−009
A8 = −7.22686e−011   A10 = 3.69112e−013   A12 = −4.71641e−016

Fourth surface

K = −4.32910e+000   A4 = 1.43210e−005   A6 = −1.68708e−008
A8 = −1.95022e−010   A10 = 9.25691e−013   A12 = −1.57298e−015

Twenty-first surface

K = −6.58661e+001   A4 = −1.24322e−005   A6 = 5.55313e−009
A8 = 4.47719e−011   A10 = −1.98987e−013   A12 = 4.07545e−016

Twenty-second surface

K = −7.91329e+000   A4 = −6.99790e−006   A6 = −8.35022e−009
A8 = 7.83919e−011   A10 = −2.47077e−013   A12 = 4.10172e−016

Various data
Zoom ratio 1.66

| | Wide angle | Intermediate | Telephoto |
|---|---|---|---|
| Focal distance | 21.74 | 29.72 | 36.01 |
| F-NUMBER | 1.85 | 2.25 | 2.45 |
| Half field angle | 29.30 | 22.32 | 18.72 |
| Image height | 12.20 | 12.20 | 12.20 |
| Total lens length | 209.70 | 209.69 | 209.69 |
| BF | 0.69 | 0.69 | 0.69 |

-continued

Various data
Zoom ratio 1.66

|  | Wide angle | Intermediate | Telephoto |
|---|---|---|---|
| d8 | 6.79 | 2.23 | 1.49 |
| d10 | 37.19 | 17.77 | 0.90 |
| d13 | 19.40 | 28.74 | 31.61 |
| d15 | 6.41 | 2.16 | 2.95 |
| d22 | 0.65 | 19.54 | 33.48 |
| Entrance pupil position | 31.22 | 28.17 | 24.83 |
| Exit pupil position | −318.06 | −1895.70 | 649.15 |
| Front principal point position | 51.48 | 57.42 | 62.84 |
| Rear principal point position | −21.05 | −29.03 | −35.32 |

Zoom lens unit data

| Unit | First surface | Focal distance | Lens structure length | Front principal point position | Rear principal point position |
|---|---|---|---|---|---|
| 1 | 1 | −23.00 | 33.37 | 10.06 | −17.84 |
| 2 | 9 | 66.11 | 4.50 | 1.73 | −0.74 |
| 3 | 11 | 88.92 | 13.34 | −0.23 | −12.14 |
| 4 | 14 | −84.30 | 1.40 | −0.54 | −1.33 |
| 5 | 16 | 64.45 | 17.92 | 12.58 | 1.37 |
| 6 | 23 | 113.03 | 68.04 | 0.36 | −45.89 |

Single lens data

| Lens | First surface | Focal distance |
|---|---|---|
| 1 | 1 | −64.34 |
| 2 | 3 | −95.39 |
| 3 | 5 | −39.39 |
| 4 | 7 | 82.04 |
| 5 | 9 | 66.11 |
| 6 | 11 | 88.92 |
| 7 | 14 | −84.30 |
| 8 | 16 | −39.57 |
| 9 | 17 | 63.99 |
| 10 | 19 | 48.62 |
| 11 | 21 | 305.46 |
| 12 | 23 | 113.03 |
| 13 | 25 | 0.00 |
| 14 | 27 | 0.00 |

Numerical Embodiment 2
Unit mm
Surface data

| Surface number | r | d | nd | vd | Effective diameter | θgF |
|---|---|---|---|---|---|---|
| 1 | 26.106 | 1.60 | 1.77071 | 23.0 | 32.29 | 0.7200 |
| 2 | 18.657 | 2.36 |  |  | 28.31 |  |
| 3* | 22.504 | 1.50 | 1.52996 | 55.8 | 27.39 |  |
| 4* | 13.337 | 9.35 |  |  | 23.92 |  |
| 5 | −36.875 | 1.15 | 1.69680 | 55.5 | 23.09 |  |
| 6 | 44.474 | (Variable) |  |  | 22.69 |  |
| 7 | 54.145 | 3.38 | 1.67270 | 32.2 | 23.14 |  |
| 8 | −65.330 | (Variable) |  |  | 23.08 |  |
| 9 | 30.655 | 3.32 | 1.80610 | 40.9 | 21.59 |  |
| 10 | −244.196 | 18.13 |  |  | 21.40 |  |
| 11 | −15.663 | 1.10 | 1.84666 | 23.9 | 15.20 |  |
| 12 | 189.518 | 0.46 |  |  | 17.35 |  |
| 13 | 50.081 | 7.22 | 1.48749 | 70.4 | 19.27 |  |
| 14 | −16.560 | 0.75 |  |  | 21.08 |  |
| 15* | −259.291 | 3.22 | 1.52996 | 55.8 | 22.43 |  |
| 16* | −49.189 | (Variable) |  |  | 23.31 |  |
| 17 | 38.631 | 3.57 | 1.69680 | 55.5 | 25.12 |  |
| 18 | −465.014 | 4.05 |  |  | 25.04 |  |
| 19 | ∞ | 29.20 | 1.51633 | 64.1 | 50.00 |  |
| 20 | ∞ | 3.25 |  |  | 50.00 |  |
| Image plane |  |  |  |  |  |  |

Aspherical data

Third surface

K = 7.99282e−001   A4 = −2.12019e−005   A6 = 6.81666e−008
A8 = 1.22725e−010   A10 = 4.36044e−013   A12 = −4.56313e−015

Fourth surface

K = −2.82404e−001   A4 = −2.94353e−005   A6 = 8.47590e−008
A8 = −5.65294e−010   A10 = 1.30095e−011   A12 = −4.53884e−014

Fifteenth surface

K = 4.34185e+002   A4 = −3.92966e−006   A6 = −1.66777e−008
A8 = −1.33969e−010   A10 = −1.56911e−013

Sixteenth surface

K = −1.62848e−001   A4 = 1.11034e−005   A6 = 1.48498e−008
A8 = −1.94007e−010   A10 = 1.68346e−012   A12 = −8.58317e−015

Various data
Zoom ratio 1.48

|  | Wide angle | Intermediate | Telephoto |
|---|---|---|---|
| Focal distance | 14.07 | 17.14 | 20.89 |
| F-NUMBER | 1.74 | 1.90 | 2.09 |
| Half field angle | 36.74 | 31.49 | 26.69 |
| Image height | 10.50 | 10.50 | 10.50 |
| Total lens length | 124.88 | 124.87 | 124.88 |
| BF | 3.25 | 3.25 | 3.25 |
| d6 | 2.17 | 3.20 | 4.52 |
| d8 | 28.51 | 19.07 | 9.13 |
| d16 | 0.60 | 9.01 | 17.62 |
| Entrance pupil position | 22.26 | 20.73 | 18.73 |
| Exit pupil position | −442.42 | 971.93 | 257.30 |
| Front principal point position | 35.88 | 38.18 | 41.34 |
| Rear principal point position | −10.82 | −13.90 | −17.64 |

Zoom lens unit data

| Unit | First surface | Focal distance | Lens structure length | Front principal point position | Rear principal point position |
|---|---|---|---|---|---|
| 1 | 1 | −14.39 | 15.96 | 9.46 | −3.83 |
| 2 | 7 | 44.52 | 3.38 | 0.93 | −1.12 |

-continued

Zoom lens unit data

| Unit | First surface | Focal distance | Lens structure length | Front principal point position | Rear principal point position |
|---|---|---|---|---|---|
| 3 | 9 | 44.48 | 34.20 | 12.80 | −30.57 |
| 4 | 17 | 51.34 | 36.82 | 0.16 | −25.25 |

Single lens data

| Lens | First surface | Focal distance |
|---|---|---|
| 1 | 1 | −93.59 |
| 2 | 3 | −65.49 |
| 3 | 5 | −28.77 |
| 4 | 7 | 44.52 |
| 5 | 9 | 33.97 |
| 6 | 11 | −17.05 |
| 7 | 13 | 26.47 |
| 8 | 15 | 113.94 |
| 9 | 17 | 51.34 |
| 10 | 19 | 0.00 |

Numerical Embodiment 3
Unit mm
Surface data

| Surface number | r | d | nd | vd | Effective diameter | θgF |
|---|---|---|---|---|---|---|
| 1 | 48.323 | 3.20 | 1.94087 | 17.4 | 61.96 | 0.6780 |
| 2 | 30.415 | 7.48 | | | 50.21 | |
| 3 | 55.054 | 3.50 | 1.58313 | 59.4 | 49.85 | |
| 4* | 17.571 | 8.79 | | | 38.34 | |
| 5 | 72.184 | 5.78 | 1.69895 | 30.1 | 37.29 | |
| 6 | −138.453 | 1.80 | 1.49700 | 81.5 | 35.34 | |
| 7 | 19.237 | (Variable) | | | 26.39 | |
| 8 | 133.204 | 2.86 | 1.78472 | 25.7 | 22.41 | |
| 9 | −66.568 | 1.64 | | | 21.67 | |
| 10 | −30.338 | 1.20 | 1.60311 | 60.6 | 20.64 | |
| 11 | 40.136 | 0.20 | | | 19.04 | |
| 12 | 24.159 | 4.37 | 1.56732 | 42.8 | 18.83 | |
| 13 | −44.037 | 9.14 | | | 18.35 | |
| 14 (Stop) | ∞ | (Variable) | | | 12.06 | |
| 15 | −16.186 | 1.00 | 1.83481 | 42.7 | 12.40 | |
| 16 | −24.701 | 0.20 | | | 13.13 | |
| 17 | 21.486 | 3.42 | 1.59270 | 35.3 | 15.93 | |
| 18 | −80.316 | 0.20 | | | 16.35 | |
| 19 | 89.520 | 1.00 | 1.83400 | 37.2 | 16.68 | |
| 20 | 14.391 | 8.01 | 1.49700 | 81.5 | 17.21 | |
| 21 | −20.310 | (Variable) | | | 19.00 | |
| 22 | −16.472 | 1.20 | 1.83400 | 37.2 | 19.51 | |
| 23 | −188.001 | 0.15 | | | 22.95 | |
| 24 | 99.654 | 8.11 | 1.49700 | 81.5 | 25.35 | |
| 25 | −23.654 | 0.15 | | | 27.77 | |
| 26 | −143.782 | 5.00 | 1.58313 | 59.4 | 30.12 | |
| 27* | −36.236 | (Variable) | | | 31.58 | |
| Image plane | ∞ | | | | | |

Aspherical data

Fourth surface

K = −5.97928e−001  A4 = −9.56083e−006  A6 = −5.27977e−009
A8 = −5.43339e−012  A10 = −2.31023e−014

Aspherical data

Twenty-seventh surface

K = 0.00000e+000  A4 = 1.29830e−005  A6 = 9.98410e−009
A8 = 2.65587e−011  A10 = −3.51774e−014

Various data
Zoom ratio 1.20

| | Wide angle | Intermediate | Telephoto |
|---|---|---|---|
| Focal distance | 20.00 | 22.00 | 24.00 |
| F-NUMBER | 4.03 | 4.21 | 4.39 |
| Half field angle | 47.3 | 44.5 | 42.0 |
| Image height | 30.50 | 30.50 | 30.50 |
| Total lens length | 150.12 | 150.12 | 150.12 |
| BF | 52.82 | 56.39 | 59.56 |
| d7 | 9.90 | 7.01 | 4.86 |
| d14 | 7.17 | 6.12 | 4.66 |
| d21 | 1.82 | 2.18 | 2.62 |
| d27 | 52.82 | 56.39 | 59.56 |
| Entrance pupil position | 26.40 | 26.08 | 25.82 |
| Exit pupil position | −69.55 | −63.95 | −57.09 |
| Front principal point position | 43.13 | 44.06 | 44.88 |
| Rear principal point position | 32.82 | 34.39 | 35.57 |

Zoom lens unit data

| Unit | First surface | Focal distance | Lens structure length | Front principal point position | Rear principal point position |
|---|---|---|---|---|---|
| 1 | 1 | −17.81 | 30.55 | 14.32 | −7.81 |
| 2 | 8 | 52.98 | 19.41 | 4.47 | −11.93 |
| 3 | 15 | 34.79 | 13.84 | 7.70 | −1.43 |
| 4 | 22 | 542.03 | 14.61 | 139.89 | 176.26 |

Single lens data

| Lens | First surface | Focal distance |
|---|---|---|
| 1 | 1 | −95.50 |
| 2 | 3 | −45.83 |
| 3 | 5 | 68.66 |
| 4 | 6 | −33.86 |
| 5 | 8 | 56.92 |
| 6 | 10 | −28.47 |
| 7 | 12 | 28.15 |
| 8 | 15 | −59.42 |
| 9 | 17 | 28.96 |
| 10 | 19 | −20.69 |
| 11 | 20 | 18.35 |
| 12 | 22 | −21.72 |
| 13 | 24 | 39.32 |
| 14 | 26 | 81.68 |

Results obtained by calculation using Conditional Expressions (1) to (6) on the zoom lenses according to Embodiments 1, 2, and 3 are illustrated in the following Table 1.

TABLE 1

| | Conditional Expression | | | | | |
|---|---|---|---|---|---|---|
| | (1) | (2) | (3) | (4) | (5) | (6) |
| Numerical Embodiment 1 | 0.802 | 3.56 | 0.00060 | 23.0 | 37.1 | 1.7707 |
| Numerical Embodiment 2 | 0.876 | 6.01 | 0.00076 | 23.0 | 32.1 | 1.7707 |
| Numerical Embodiment 3 | 0.806 | 4.40 | 0.00076 | 17.4 | 30.1 | 1.9410 |

Embodiments 1, 2, and 3 are described in detail, but the present invention is not limited to the embodiments and various modifications and changes may be made without departing from the scope of the present invention. For example, the fourth lens unit and the fifth lens unit as described in Embodiment 1 may be moved as a single lens unit. That is, a zoom lens may include, in order from the magnifying side, five lens units having negative, positive, positive, positive, and positive refractive powers.

Each of the zoom lenses according to Embodiments 1, 2, and 3 described above may be applied to an optical apparatus such as an image pickup apparatus or an image projection apparatus.

Figure 7:
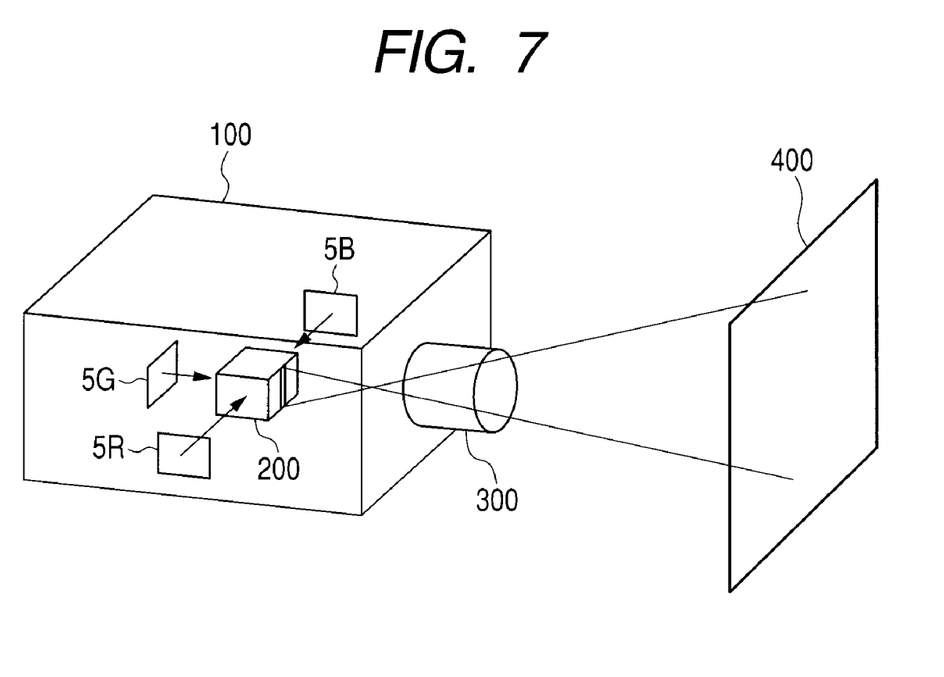
FIG. 7 illustrates an image projection apparatus according to the present invention.

FIG. 7 illustrates a three-plate type color liquid crystal projector using the zoom lens according to the present invention as a projection lens, which is an image projection apparatus in which multiple color beams from multiple liquid crystal display elements are combined by a color combining unit and enlarged and projected onto a screen by the projection lens. In a color liquid crystal projector 100 illustrated in FIG. 7, respective light beams from three panels 5R, 5G, and 5B for R (red light), G (green light), and B (blue light) are combined by a prism 200 serving as the color combining unit, to thereby form a single optical path. In FIG. 7, the single prism 200 is illustrated as the color combining unit. However, the present invention is not limited to such a prism. Multiple prisms (dichroic prism or polarization beam splitter) may be used. A combined color beam obtained by the color combining unit is projected to a screen 400 by a zoom lens 300.

An image pickup apparatus according to the present invention desirably includes: an image pickup element (photoelectric transducer) such as a CCD; and a zoom lens (which may be any of zoom lenses according to Embodiments 1, 2, and 3) for forming an image of a subject on a light incident surface of the image pickup element.

While the present invention has been described with reference to exemplary embodiments, it is to be understood that the invention is not limited to the disclosed exemplary embodiments.

This application claims the benefit of Japanese Patent Application No. 2008-316039, filed Dec. 11, 2008, which is hereby incorporated by reference herein in its entirety.

What is claimed is:

1. A zoom lens, comprising, in order from a magnifying side:
a first lens unit having a negative refractive power;
a second lens unit having a positive refractive power; and
a rear lens group, which includes multiple lens units and has a positive refractive power as a whole,
wherein at least two lens units are moved for magnification,
wherein a whole lens system of the zoom lens comprises the first lens unit, the second lens unit, and the rear lens group,
wherein the first lens unit includes a first lens having a negative refractive power, and
wherein the following conditions are satisfied:

$$0.79 < \theta g F_{NL} - (1.0 \times 10^{-r} \times v d_{NL}^2 - 9.1 \times 10^{-3} \times v d_{NL}) < 1.00,$$

$$1.5 < (R1+R2)/(R1-R2) < 10.0, \text{ and}$$

$$0.0005 < |(\Delta \theta g F_{NL} \cdot fw)/(v d_{NL} \cdot f_{NL})| < 0.0020,$$

where R1 and R2 indicate a magnifying side curvature radius and a reduction side curvature radius of the first lens, $\theta g F_{NL}$ indicates a partial dispersion ratio of the first lens with respect to a g-line and an F-line, $v d_{NL}$ indicates an Abbe number of the first lens, $f_{NL}$ indicates a focal length of the first lens, and fw indicates a focal length of the whole lens system at a wide angle end, and where $\Delta \theta g F_{NL} = \theta g F_{NL} - (-0.001682 \times v d_{NL} + 0.6438)$.

2. A zoom lens according to claim 1, wherein the Abbe number $v d_{NL}$ of the first lens satisfies the following condition:

$$10.0 < v d_{NL} < 23.5.$$

3. A zoom lens according to claim 1, wherein the following condition is satisfied:

$$10.0 < vp < 38.0$$

where vp indicates an Abbe number of a positive lens located closest to the first lens.

4. A zoom lens according to claim 1, wherein the following condition is satisfied:

$$1.70 < N_{NL} < 2.30$$

where $N_{NL}$ indicates a refractive index of the first lens.

5. A zoom lens according to claim 1, wherein the first lens is located on the most magnifying-side among multiple lenses constituting the zoom lens.

6. A zoom lens according to claim 1, wherein the rear lens group comprises, in order from the magnifying side, a third lens unit having a positive refractive power and a fourth lens unit having a negative refractive power.

7. A zoom lens according to claim 1, wherein the rear lens group comprises, in order from the magnifying side, a third lens unit having a positive refractive power, a fourth lens unit having a negative refractive power, a fifth lens unit having a positive refractive power, and a sixth lens unit having a positive refractive power.

8. A zoom lens according to claim 1, wherein an image of a subject is formed on a light incident surface of an image pickup element.

9. A zoom lens according to claim 1, wherein a projection surface and an image display element are configured to have a conjugate relationship so that an image displayed on the image display element is projected onto the projection surface.

10. An optical apparatus, including the zoom lens according to claim 1.

* * * * *